(12) United States Patent
Hamasaki et al.

(10) Patent No.: US 10,479,201 B2
(45) Date of Patent: Nov. 19, 2019

(54) IN-VEHICLE DISPLAY SYSTEM AND CONTROL METHOD FOR IN-VEHICLE DISPLAY SYSTEM

(71) Applicant: Panasonic Intellectual Property Management Co., Ltd., Osaka (JP)

(72) Inventors: Koji Hamasaki, Hyogo (JP); Daiki Matsuda, Osaka (JP); Koumei Kubota, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/765,493

(22) PCT Filed: Oct. 5, 2016

(86) PCT No.: PCT/JP2016/004490
§ 371 (c)(1),
(2) Date: Apr. 3, 2018

(87) PCT Pub. No.: WO2017/068759
PCT Pub. Date: Apr. 27, 2017

(65) Prior Publication Data
US 2019/0070959 A1   Mar. 7, 2019

(30) Foreign Application Priority Data

Oct. 19, 2015 (JP) .................. 2015-205619

(51) Int. Cl.
*G06F 7/00* (2006.01)
*B60K 35/00* (2006.01)
(Continued)

(52) U.S. Cl.
CPC .............. *B60K 35/00* (2013.01); *G06F 13/00* (2013.01); *H04N 21/4122* (2013.01);
(Continued)

(58) Field of Classification Search
CPC .............. B60K 35/00; B60K 2350/106; B60K 2350/1076; B60K 2350/352; B60K 2350/901; H04N 21/4122; B60R 11/02
(Continued)

(56) References Cited

U.S. PATENT DOCUMENTS

2004/0258413 A1   12/2004   Nakano et al.
2005/0116879 A1   6/2005    Arai
(Continued)

FOREIGN PATENT DOCUMENTS

JP   2005-009892     1/2005
JP   2005-043695 A   2/2005
(Continued)

OTHER PUBLICATIONS

International Search Report of PCT application No. PCT/JP2016/004490 dated Dec. 27, 2016.

*Primary Examiner* — Mahmoud S Ismail
(74) *Attorney, Agent, or Firm* — Greenblum & Bernstein, P.L.C.

(57) ABSTRACT

An in-vehicle display system is provided with first display unit, second display unit, vehicle information acquisition unit, and CPU. When a display operation for outputting at least a portion of first content to second display unit with the first content being output to first display unit is performed, CPU selects either of first display unit and second display unit with which to associate an authority to operate the output of at least one of first display unit and second display unit according to at least one signal from among a plurality of signals indicating a type of the first content, an attribute of first display unit, an attribute of second display unit, vehicle information, and a detail of the display operation.

6 Claims, 13 Drawing Sheets

(51) Int. Cl.
*G06F 13/00* (2006.01)
*H04N 21/41* (2011.01)

(52) U.S. Cl.
CPC ..... *B60K 2370/11* (2019.05); *B60K 2370/111* (2019.05); *B60K 2370/152* (2019.05); *B60K 2370/16* (2019.05); *B60K 2370/182* (2019.05); *B60K 2370/184* (2019.05); *B60K 2370/195* (2019.05); *B60K 2370/52* (2019.05); *B60K 2370/736* (2019.05); *B60K 2370/739* (2019.05)

(58) Field of Classification Search
USPC .......................................................... 701/36
See application file for complete search history.

(56) References Cited

U.S. PATENT DOCUMENTS

| | | | |
|---|---|---|---|
| 2006/0066506 A1 | 3/2006 | Nojiri et al. | |
| 2008/0068284 A1 | 3/2008 | Watanabe et al. | |
| 2016/0280068 A1* | 9/2016 | Oku | B60R 11/02 |

FOREIGN PATENT DOCUMENTS

| | | |
|---|---|---|
| JP | 2005-136958 | 5/2005 |
| JP | 2006-027579 | 2/2006 |
| JP | 2006-103450 | 4/2006 |
| JP | 2007-024854 | 2/2007 |
| JP | 2013-024948 A | 2/2013 |

* cited by examiner

IN-VEHICLE DISPLAY SYSTEM AND CONTROL METHOD FOR IN-VEHICLE DISPLAY SYSTEM

This application is a U.S. national stage application of the PCT International Application No. PCT/JP2016/004490 filed on Oct. 5, 2016, which claims the benefit of foreign priority of Japanese patent application No. 2015-205619 filed on Oct. 19, 2015, the contents all of which are incorporated herein by reference.

TECHNICAL FIELD

The present disclosure relates to an in-vehicle display system provided with a plurality of display units and a control method for said in-vehicle display system.

BACKGROUND ART

PTL 1 discloses an in-vehicle audiovisual (A/V) system provided with a plurality of display units in a vehicle. In this in-vehicle A/V system, in a case where the plurality of display units displays a same source, any one of the display units is given a function (priority) to preferentially operate the source. This in-vehicle A/V system prevents the display content on the display unit to which the priority is given from being impaired by the operation of the display unit to which the priority is not given.

PTL 2 discloses a device for controlling multiple monitors in a vehicle, the device being provided with a front monitor and a rear monitor in the vehicle. The front monitor is installed near a driver. The rear monitor is installed to a rear seat. According to the device for controlling multiple monitors in a vehicle, an AV device such as a digital versatile disk (DVD) player that enables viewing on the rear monitor can be safely operated through the front monitor even while the vehicle is traveling.

CITATION LIST

Patent Literature

PTL 1: Unexamined Japanese Patent Publication No. 2006-27579

PTL 2: Unexamined Japanese Patent Publication No. 2006-103450

SUMMARY OF THE INVENTION

An in-vehicle display system according to the present disclosure is provided with a first display unit, a second display unit, a vehicle information acquisition unit that acquires vehicle information, and a controller. When a display operation for outputting at least a portion of first content to the second display unit with the first content being output to the first display unit is performed, the controller selects either of the first display unit and the second display unit with which to associate an authority to operate an output of at least one of the first display unit and the second display unit according to at least one of signals indicating a type of the first content, an attribute of the first display unit, an attribute of the second display unit, vehicle information, and a detail of the display operation.

The present disclosure provides a control method for an in-vehicle display system provided with a first display unit, a second display unit, a vehicle information acquisition unit, and a controller, and mounted to a vehicle. The control method for the in-vehicle display system includes acquiring and selecting vehicle information. In the acquiring the vehicle information, the vehicle information acquisition unit acquires the vehicle information which is information about the vehicle. In the selecting the vehicle information, when a display operation for outputting at least a portion of first content to the second display unit with the first content being output to the first display unit is performed, the controller selects either of the first display unit and the second display unit with which to associate an authority to operate an output of at least one of the first display unit and the second display unit according to at least one of signals indicating a type of the first content, an attribute of the first display unit, an attribute of the second display unit, vehicle information, and a detail of the display operation.

The in-vehicle display system according to the present disclosure can improve functionality of the whole system. The control method for the in-vehicle display system according to the present disclosure can improve functionality of the whole in-vehicle display system.

DESCRIPTION OF EMBODIMENTS

Figure 1:
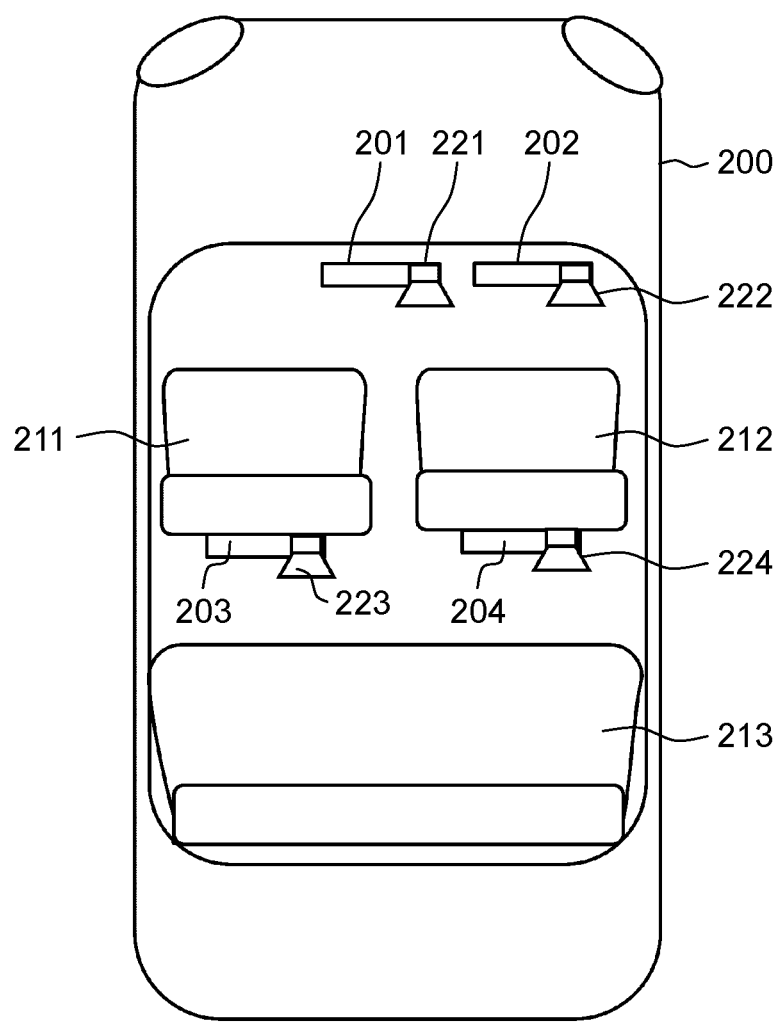
FIG. 1 is a view illustrating an outer appearance of an entire in-vehicle display system according to a first exemplary embodiment of the present disclosure.

Hereinafter, exemplary embodiments will be described in detail with reference to the drawings as appropriate. However, detailed descriptions that are more than necessary may be omitted. For example, a detailed description of a matter which is already well-known and a repeated description for a substantially identical configuration may be omitted. This is to avoid unnecessary redundancy of the following description and facilitate the understanding of those skilled in the art.

Note that the attached drawings and the following description are provided for those skilled in the art to fully understand the present disclosure, and are not intended to limit the subject matter as described in the appended claims.

(First Exemplary Embodiment)

A first exemplary embodiment will be described below with reference to FIGS. 1 to 12.

[1. Outline]

An in-vehicle display system and a control method for the in-vehicle display system according to the first exemplary embodiment will be briefly described below by way of specific examples.

For example, the in-vehicle display system is provided with a display unit for a driver's seat (this display unit is defined as a first display unit) and a display unit for a passenger seat (this display unit is defined as a second display unit). In a state where a car navigation is output to the first display unit, a screen of this car navigation can be displayed on the second display unit. A controller of the in-vehicle display system can select either one of the first display unit and the second display unit to operate the output of the car navigation displayed on the first display unit. That is, an authority to operate the first display unit can be given to an operating unit of the second display unit, for example. When selecting a destination to which the authority to operate the first display unit is to be given, the controller takes the following conditions into consideration, such as a condition regarding the content output to the first display unit being a car navigation, and a condition regarding which seat has the first display unit or the second display unit.

The in-vehicle display system may select a destination to which an authority to operate the second display unit is to be given, in addition to the authority to operate the first display unit. Examples of conditions which are taken into consideration for selecting a destination to which an authority is to be given include vehicle information such as a speed of the vehicle and a driving condition, functions (attributes) of the respective display units, and a detail of a display operation performed by a user.

As described above, in the in-vehicle display system according to the first exemplary embodiment, the display units are in coordination with one another in various ways. Therefore, an operation to a certain display unit can be supported in various ways through another display unit. Accordingly, functionality of the whole system can be improved.

[2. Configuration]

[2-1. Outer Appearance of Entire In-vehicle Display System]

FIG. 1 is a view illustrating an outer appearance of the entire in-vehicle display system according to the first exemplary embodiment.

Vehicle 200 includes driver's seat 211, passenger seat 212, and rear seat 213. Vehicle 200 also includes display devices 201 to 204 serving as display units and sound output devices 221 to 224.

Display device 201 is disposed in front of driver's seat 211 (upper side in FIG. 1). Display device 201 is used by a user seated on driver's seat 211.

Display device 202 is disposed in front of passenger seat 212. Display device 202 is used by a user seated on passenger seat 212.

Display device 203 is disposed on the back of driver's seat 211. Display device 203 is used by a user seated on rear seat 213 behind driver's seat 211.

Display device 204 is disposed on the back of passenger seat 212. Display device 204 is used by a user seated on rear seat 213 behind passenger seat 212.

Sound output device 221 can output a sound according to an output from display device 201. Sound output device 222 can output a sound according to an output from display device 202. Sound output device 223 can output a sound according to an output from display device 203. Sound output device 224 can output a sound according to an output from display device 204. The sound output devices are not limited to a speaker, and may be a device, such as a headphone, that can output a sound.

In FIG. 1, two display devices are installed each at the front seats and at the rear seats. However, a number of the display devices is not limited to four. Similarly, a number of seats is not limited to four.

[2-2. Electric Configuration of In-vehicle Display System]

Figure 2:
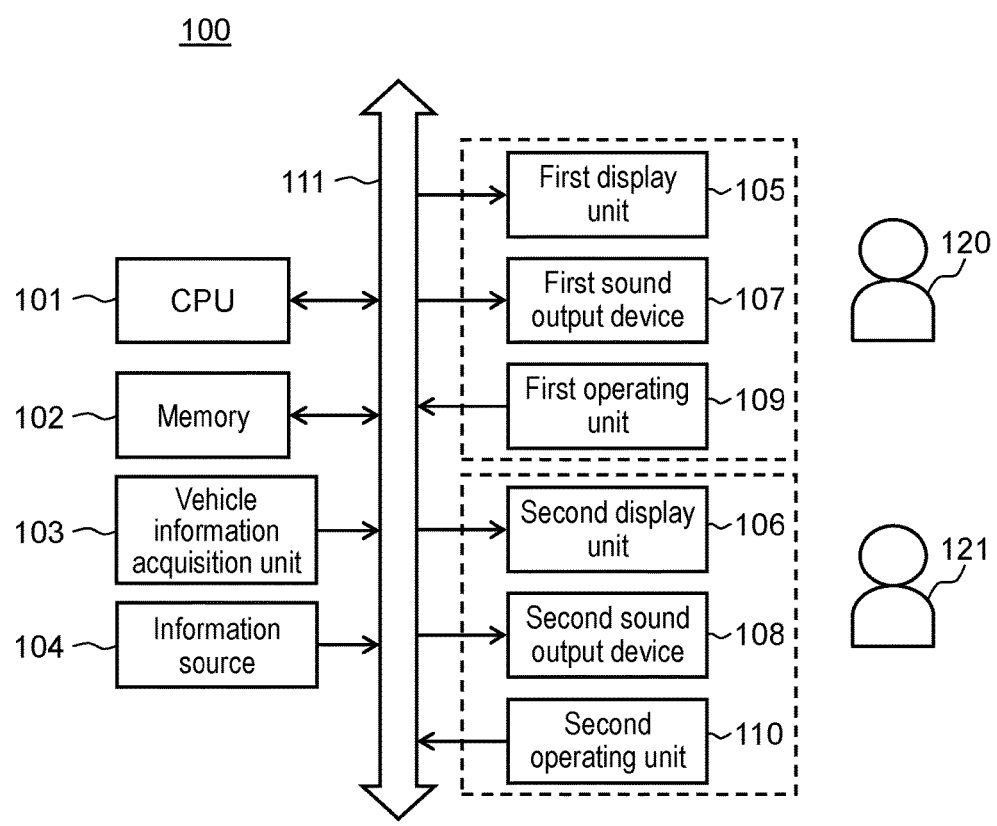
FIG. 2 is a block diagram illustrating an electric configuration of the in-vehicle display system according to the first exemplary embodiment of the present disclosure.

FIG. 2 is a block diagram illustrating an electric configuration of the in-vehicle display system according to the first exemplary embodiment.

In-vehicle display system 100 according to the first exemplary embodiment includes central processing unit (CPU) 101 serving as the controller, memory 102, vehicle information acquisition unit 103, information source 104, first display unit 105, second display unit 106, first sound output device 107, second sound output device 108, first operating unit 109, and second operating unit 110. These components are respectively connected to transmission path 111. These components are disposed at predetermined positions of vehicle 200 illustrated in FIG. 1. Note that FIG. 2 illustrates only two display units for facilitating the description. First display unit 105 and second display unit 106 correspond to any of display devices 201 to 204 in FIG. 1. First sound output device 107 and second sound output device 108 correspond to any of sound output devices 221 to 224.

First display unit 105, first sound output device 107, and first operating unit 109 are disposed near user 120, and used by user 120. Second display unit 106, second sound output device 108, and second operating unit 110 are disposed near user 121, and used by user 121.

CPU 101 includes a non-volatile memory storing a program, a volatile memory that is a temporal storage area for executing a program such as an application, an input/output port, and a processor that executes the program, for example. CPU 101 executes an application using memory 102. CPU 101 determines a display destination for the application currently executed on first display unit 105 and second display unit 106 and a destination to which an authority to operate the application is to be given. CPU 101 controls an output of content displayed on first display unit 105 and second display unit 106 according to various signals. The various signals are at least any of a detail of a display operation input through first operating unit 109, a detail of a display operation input through second operating unit 110, an attribute of first display unit 105, an attribute of second display unit 106, a type of content currently displayed on first display unit 105, a type of content currently displayed on second display unit 106, and vehicle information acquired by vehicle information acquisition unit 103. The type of content may be determined based on the type of an application by which the content is output. CPU 101 generates display data to be displayed on first display unit 105 and second display unit 106 by using memory 102.

Memory 102 is used as a work memory of CPU 101. Memory 102 includes a volatile memory such as a dynamic random access memory (DRAM) and a non-volatile memory such as a flash memory. Memory 102 stores various signals. The various signals include the attributes of first display unit 105 and second display unit 106, the types of the applications currently executed on first display unit 105 and second display unit 106, and vehicle information acquired by vehicle information acquisition unit 103, for example. Memory 102 also includes a frame memory for video data to be displayed on first display unit 105 and second display unit 106.

Vehicle information acquisition unit 103 acquires vehicle information that indicates a state of a vehicle which is traveling. The vehicle information is at least any of a vehicle speed, an accelerator state, a brake state, an inclination of the vehicle, vacant seat information, and failure information, for example. The vehicle information is acquired from a control area network (CAN), vehicle speed pulses, and various sensors installed inside the vehicle, for example.

Information source 104 corresponds to at least any of a radio, a television (TV), a compact disk (CD) player, a DVD player, and a server on the Internet that provides audio video (AV) contents.

First display unit 105 and second display unit 106 are a display device having a display screen such as a liquid crystal display (LCD).

Basically, first sound output device 107 is disposed near first display unit 105 and outputs a sound included in content on first display unit 105. Further, second sound output device 108 is disposed near second display unit 106 and outputs a sound included in content on second display unit 106. However, a sound of content other than the content on display unit 105 may be output from the first sound output device according to user setting.

First operating unit 109 is provided for enabling user 120 using first display unit 105 to input instructions regarding various operations. Second operating unit 110 is provided for enabling user 121 using second display unit 106 to input various operations. The various operations include an on/off of a power source, volume control of an accompanying sound of an application, an operation for selecting and playing AV content, and a display operation in the first exemplary embodiment such as a movement operation, a copy operation, a mirror operation, and a returning operation, for an application. Signals indicating the various operations described above are input to CPU 101. First operating unit 109 and second operating unit 110 correspond to operation keys provided to a remote controller or first and second display units 105 and 106, and touch panels provided to first and second display units 105 and 106.

Transmission path 111 is a transmission path used for communication among respective components. That is, CPU 101, memory 102, vehicle information acquisition unit 103, information source 104, first display unit 105, second display unit 106, first sound output device 107, second sound output device 108, first operating unit 109, and second operating unit 110 are respectively connected to transmission path 111, and communicate with one another by wire. As transmission path 111, a transmission path complying with a High-Definition Multimedia Interface (HDMI) (registered trademark) standard or media oriented systems transport (MOST) capable of transmitting a video and sound is used, for example. In addition, a transmission path for control signals may be separately provided for communication of control signals.

[2-3. Description of Terms]

Terms used for describing the configuration of the first exemplary embodiment will be described below.

[2-3-1. Application]

An application is software executed through the display units. The application in the first exemplary embodiment is classified into three types which are application 1 to application 3 based on the priority level of content to be output.

Application 1 outputs content having a high entertainment factor. Examples of application 1 include a TV, a DVD player, and a radio. Application 2 outputs content having relatively a low entertainment factor and a high informative factor. Examples of application 2 include a car navigation and an air conditioner setting. Application 3 outputs content having high emergency. Examples of application 3 include a display of a phone or failure information of the vehicle. Any of applications 1 to 3 may be set as default content for a screen display. The default content means an initial state of a screen display and a sound. Default content for a sound is categorized as application 1. The same application may be used for both the screen display and the sound as the default content, or different applications may be used for the screen display and the sound as the default content. In the first exemplary embodiment, the priority level of application 3 is the highest. The priority level of application 2 is higher than the priority level of application 1. These priority levels can be set as appropriate.

The sound in the first exemplary embodiment indicates a sound including entertainment factors, such as a sound from a TV, a radio, a phone, music, and a movie, not a sound regarding route guidance information of the car navigation or operation information such as air conditioner setting.

[2-3-2. Attribute of Display Unit]

The attribute of a display unit in the first exemplary embodiment is a definition indicating a user using the display unit. Each display unit in the first exemplary embodiment is categorized as one of two attributes, attribute 1 and attribute 2. Attribute 1 indicates that the user is a driver. Attribute 2 indicates that the user is other than the driver. For safety, the driver may have a limitation regarding an operation for a display unit, depending on a driving condition. Therefore, the attribute of the display unit is changed depending on whether the user of the display unit is the driver. For example, display device 201 in FIG. 1 is categorized as attribute 1, and display devices 202, 203, and 204 are categorized as attribute 2.

The attribute of the display unit may indicate the relevance to the place where the display unit is disposed. For example, the display unit disposed in front of the driver's seat may be categorized as attribute 1, and the display unit disposed at the front other than the place in front of the driver's seat may be categorized as attribute 2. In the first exemplary embodiment, the priority level of the display unit having attribute 1 is higher than the priority level of the display unit having attribute 2. The priority levels can be set as appropriate.

[3. Operation]

An operation of the in-vehicle display system according to the first exemplary embodiment will be described below.

[3-1. Mode of Display Operation]

Four display operations which can be performed in the first exemplary embodiment will be described below.

In the first exemplary embodiment, a state where first display unit 105 displays content (hereinafter referred to as first content) output by a first application and second display unit 106 displays content (hereinafter referred to as second content) output by a second application is defined as a reference state. The first application and the second application are one example of the application.

In the reference state, an authority to operate the first application is given to first operating unit 109. That is, the authority to operate the first application is associated with first display unit 105. An authority to operate the second application is given to second operating unit 110. That is, the authority to operate the second application is associated with second display unit 106. In this reference state, a display operation for outputting at least a portion of the first content to the second display unit can be performed.

The display operation performed in the reference state includes three types of operations which are operations for movement, mirror, and copy. Which one of the operations for movement, mirror, and copy the display operation corresponds to is determined based on the display content of first display unit 105 after the display operation and a destination to which the authority to operate first display unit 105 and second display unit 106 is given after the display operation.

In addition, the display operation for returning the display on first display unit 105 and the authority to operate first display unit 105 to the reference state after the operation for movement is performed as the display operation is defined as a returning operation.

Each of the four types of display operations will be described below. Each display operation will be described by using examples where first display unit 105 and second display unit 106 correspond to any of display devices 201 to 204 in FIG. 1.

[3-1-1. Movement]

The operation for movement is one of the display operations for moving the first content currently displayed on first display unit 105 to second display unit 106. Hereinafter, the display operation for movement is referred to as a movement operation. Due to the movement operation, the default content is displayed on first display unit 105. The first content is displayed on second display unit 106. Further, the destination to which the authority to operate the output of the first content, that is, the authority to operate the first application, is given is changed to second display unit 106 from first display unit 105. After the movement operation, the first application is operated by user 121 who uses second display unit 106.

The movement operation is effective in a situation where user 120 who is driving on driver's seat 211 requests user 121 on passenger seat 212 to perform the operation for a car navigation in place of user 120, for example. In this case, first display unit 105 is display device 201, and second display unit 106 is display device 202. User 121 seated on passenger seat 212 can operate the car navigation displayed on second display unit 106 in place of user 120.

[3-1-2. Mirror]

The operation for mirror is one of the display operations for displaying the first content currently displayed on first display unit 105 also on second display unit 106. Hereinafter, the display operation for mirror is referred to as a mirror operation. Due to the mirror operation, both first display unit 105 and second display unit 106 output the first content. Further, even after the mirror operation, first display unit 105 has the authority to operate the output of the first content, that is, the authority to operate the first application. When user 120 operates the output of the first content through first display unit 105 after the mirror operation, the first content reflecting this operation is displayed on both first display unit 105 and second display unit 106.

The mirror operation is effective for a situation where a child viewing display device 203 or display device 204 on rear seat 213 asks an adult on passenger seat 212 to play content he/she wishes to view, for example. In this case, first display unit 105 is display device 202, and second display unit 106 is display device 203 or display device 204. User 120 seated on passenger seat 212 operates first operating unit 109 to reproduce the desired content from information source 104 and display the reproduced content on second display unit 106.

[3-1-3. Copy]

The operation for copy is one of the display operations for displaying the first content currently displayed on first display unit 105 also on second display unit 106. Hereinafter, the display operation for copy is referred to as a copy operation. After the copy operation, both first display unit 105 and second display unit 106 output the first content. After the copy operation, first display unit 105 has the authority to operate the output of the first content displayed on first display unit 105. Second display unit 106 has the authority to operate the output of the first content displayed on second display unit 106. That is, user 120 and user 121 can individually operate the output of the first content through first display unit 105 and second display unit 106, respectively, after the copy operation.

The copy operation is effective for a situation where a user seated on rear seat 213 and using display device 203 allows a user using display device 204 to view the content he/she is currently viewing, for example. In this case, first display unit 105 is display device 203, and second display unit 106 is display device 204. User 120 allows user 121 to view, through display device 204, the content he/she is now viewing on display device 203. The authority to operate the output of the content is given to the respective display devices, and thus, user 120 using display device 203 and user 121 using display device 204 can individually operate the output of the content.

[3-1-4. Returning]

The operation for returning is a display operation for outputting again the first content on first display unit 105 and returning the authority to operate the first application to first operating unit 109 from second operating unit 110 after the movement operation. Hereinafter, the display operation for returning is referred to as a returning operation. Due to the returning operation, the second content may be displayed on second display unit 106 as in the reference state, or the default content may be displayed on second display unit 106.

The returning operation is performed in a case where, after user 120 on driver's seat 211 requests user 121 on passenger seat 212 to perform the operation for the application in place of user 120 during driving, user 120 becomes capable of operating the application because the vehicle stops, for example.

[3-2. Sound Control]

In the first exemplary embodiment, a sound output to first sound output device 107 and second sound output device 108 is controlled according to the type of the display operation.

A case where the display operation is any one of the movement operation, copy operation, and returning operation will be described. If the first content includes a sound, second sound output device 108 outputs the sound included in the first content after the display operation described above.

If the first content does not include a sound, second sound output device 108 maintains the reference state even after the display operation. That is, if the second sound output device outputs a sound in the second content in the reference state, it continues to output this sound even after the display operation such as the movement operation, the copy operation, or the returning operation is executed.

A case where the display operation is the mirror operation will be described. Regardless of whether the first content includes a sound, second sound output device 108 maintains the reference state after the mirror operation. That is, even if the first content includes a sound, second sound output device 108 does not output this sound. User 121 using second display unit 106 can view the content displayed on second display unit 106, while listening to the sound he/she has been listening. It should be noted that, even in the mirror operation, a sound included in the first content may be output from second sound output device 108 according to the detail of the first content and the like.

[3-3. Operation Flow]

An operation of the in-vehicle display system when any of the movement operation, copy operation, mirror operation, and returning operation is performed as the display operation will be described.

[3-3-1. Common Operation]

Figure 3:
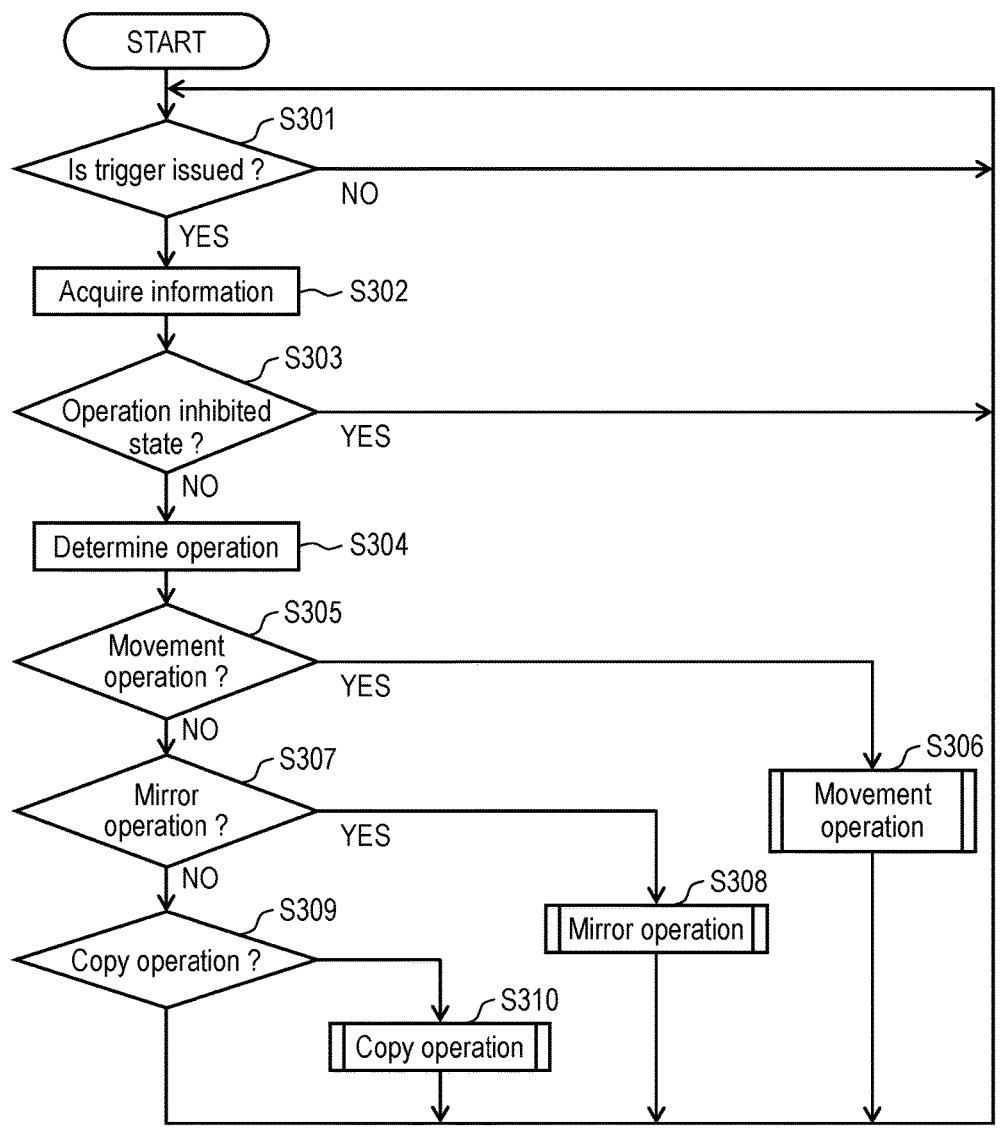
FIG. 3 is a flowchart illustrating an operation of the in-vehicle display system according to the first exemplary embodiment of the present disclosure.

FIG. 3 is a flowchart illustrating an operation of the in-vehicle display system according to the first exemplary embodiment. FIG. 3 illustrates a common operation when any one of the movement operation, copy operation, and mirror operation is performed as the display operation through first display unit 105 in the reference state.

In the reference state, CPU 101 determines whether vehicle information is input from vehicle information acquisition unit 103 or an input regarding the display operation of any of the movement operation, copy operation, and returning operation is given from first operating unit 109 (step S301). When determining that either of the inputs is given, CPU 101 proceeds to step S302, and when determining that there is no input, CPU 101 repeats the process in step S301.

CPU 101 acquires signals regarding types of applications currently executed on first display unit 105 and second display unit 106, vehicle information acquired by vehicle information acquisition unit 103, attributes of first display unit 105 and second display unit 106, and the detail of the display operation input to first operating unit 109, and stores the signals into memory 102 (step S302). If user 120 specifies any one of the movement operation, mirror operation, and copy operation as the display operation and inputs the specified operation to first operating unit 109, the detail of the display operation includes a signal indicating the type of the specified display operation.

When CPU 101 determines in step S301 that an operation input is given from first operating unit 109, and the input operation detail is stored in memory 102 in step S302, CPU 101 determines whether the acquired operation detail is executable or not (step S303). When determining that the acquired operation detail is executable, CPU 101 proceeds to step S304, and when determining that it is not executable, CPU 101 returns to step S301. At that time, CPU 101 may provide notification indicating that the operation cannot be executed to the user who has input the operation detail through first display unit 105 or second display unit 106. Alternatively, CPU 101 may provide notification regarding that the operation cannot be executed to the user who has input the operation detail by using first sound output device 107 or second sound output device 108.

CPU 101 determines that the operation cannot be executed in the following conditions, for example.

Under a condition where the vehicle is in an emergency situation such as the vehicle being in failure.

When being in an emergency situation, the vehicle is automatically turned into a state where any application cannot be executed.

Under a situation where second display unit 106 displays predetermined content such as a pop-up window or augmented reality (AR) display.

Under a situation where the second application is application 3 that outputs content having high emergency such as a phone.

Under a situation where there is no user 121 using second display unit 106.

Under a situation where user 121 using second display unit 106 is sleeping.

Under a situation where the priority level of the second application is higher than the priority level of the first application.

Under a situation where the second application is in a state of having a higher priority level.

Examples of this situation include a case where the second application is a phone application and the user using the second application is calling.

CPU 101 determines the executable display operation from among the movement operation, the copy operation, the mirror operation, and the returning operation according to at least one of the signals indicating the vehicle information, the type of the application, the attribute of the display unit, and the detail of the display operation (step S304). The step for determining the display operation will be described below.

CPU 101 determines whether the vehicle is in a normal state or in a non-normal state based on the vehicle information from the vehicle information acquisition unit. The non-normal state indicates a state where the vehicle is in failure or a state where the vehicle is traveling at a speed exceeding a predetermined upper-limit speed.

When determining that the vehicle is in the non-normal state and the attribute of first display unit 105 is attribute 1, CPU 101 may determine an executable display operation based on the type of the application which is currently displayed on first display unit 105. For example, when the content of application 2 or the content of application 3 is displayed on first display unit 105, CPU 101 selects the movement operation. When the content of application 1 is displayed on first display unit 105, CPU 101 selects the copy operation.

Further, CPU 101 may determine the executable display operation based on whether user 121 using second display unit 106 can perform the operation for the application. For example, if user 121 using second display unit 106 is an adult, any display operations can be selected, and therefore, CPU 101 may select the movement operation, for example. If user 121 using second display unit 106 is a child having difficulty operating the application, CPU 101 may select the mirror operation.

If user 120 using first display unit 105 requests user 121 to perform the operation for the application such as a car navigation application in place of user 120 by the movement operation, CPU 101 may instruct second display unit 106 to display a message for confirming that user 121 can support user 120. As described above, CPU 101 may execute the movement operation after receiving a confirmation from user 121 using second display unit 106.

CPU 101 determines whether the determined display operation is the movement operation (step S305). When determining that the display operation is the movement operation, CPU 101 proceeds to step S306. In step S306, CPU 101 executes the movement operation. The process for executing the movement operation will be described later. On the other hand, when determining that the display operation is not the movement operation in step S305, CPU 101 proceeds to step S307.

In step S307, CPU 101 determines whether the determined display operation is the mirror operation. When determining that the determined display operation is the mirror operation, CPU 101 proceeds to step S308. In step S308, CPU 101 executes the mirror operation. The process for executing the mirror operation will be described later. On the other hand, when determining that the display operation is not the mirror operation in step S307, CPU 101 proceeds to step S309.

In step S309, CPU 101 determines whether the determined display operation is the copy operation. When determining that the display operation is the copy operation, CPU 101 proceeds to step S310. In step S310, CPU 101 executes the copy operation. The process for executing the copy operation will be described later. On the other hand, when determining that the display operation is not the copy operation in step S309, CPU 101 executes a necessary process, and then, returns to step S301.

[3-3-2. Movement Operation]

Figure 4:
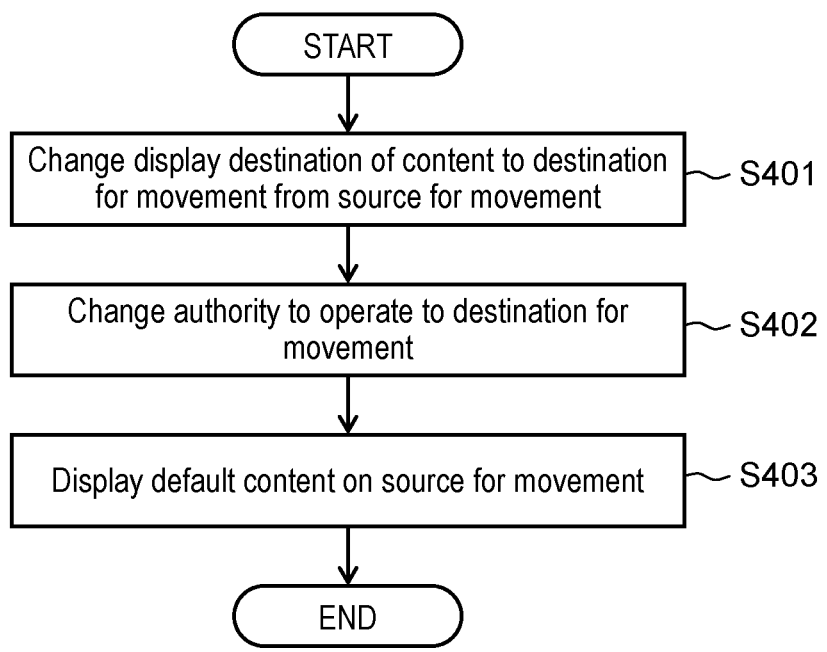
FIG. 4 is a flowchart illustrating a movement operation of the in-vehicle display system according to the first exemplary embodiment of the present disclosure.

The process when CPU 101 executes the movement operation in step S306 in FIG. 3 will be described below. FIG. 4 is a flowchart illustrating the movement operation of the in-vehicle display system according to the first exemplary embodiment. All steps in FIG. 4 are included in step S306.

CPU 101 changes the display destination of the first content output by the first application to second display unit 106 (destination for movement) from first display unit 105 (source for movement) (step S401).

Then, CPU 101 changes the destination to which the authority to operate the first application is given to second operating unit 110 from first operating unit 109. After that, the operation for the first application is performed by user 121 using second display unit 106 through second operating unit 110.

CPU 101 displays the default content on first display unit 105 (step S403).

[3-3-3. Mirror Operation]

Figure 5:
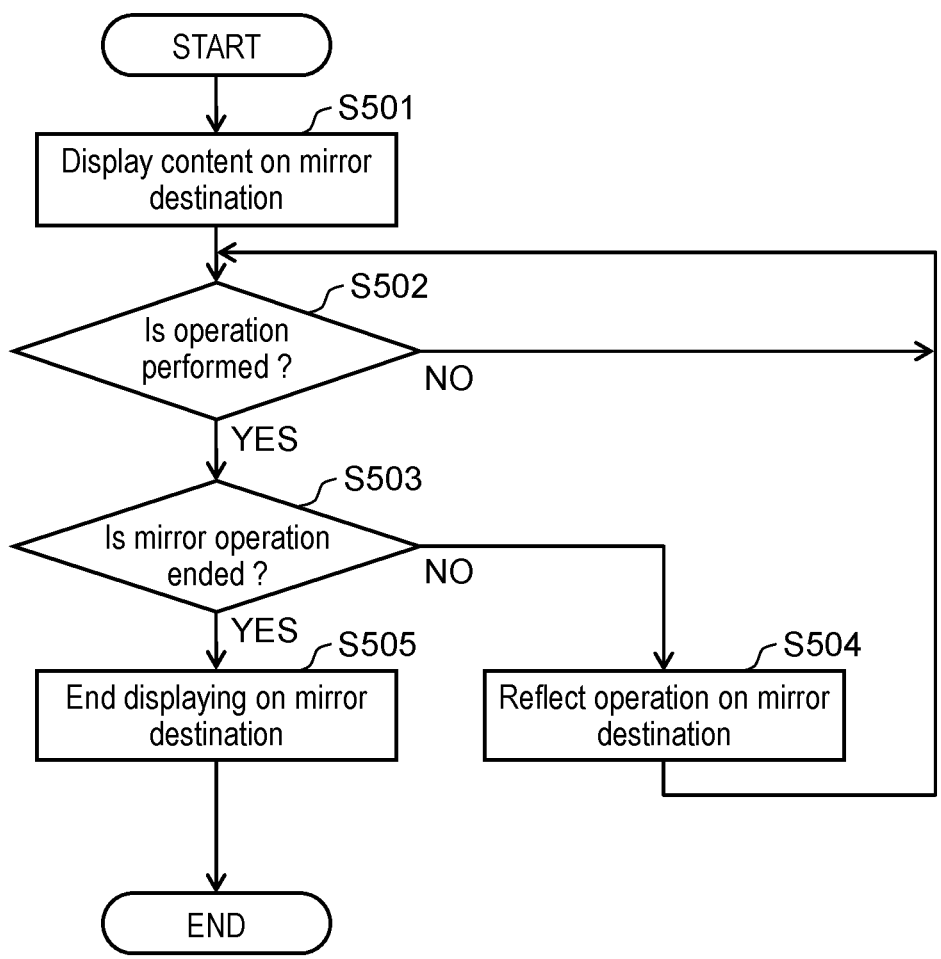
FIG. 5 is a flowchart illustrating a mirror operation of the in-vehicle display system according to the first exemplary embodiment of the present disclosure.

The process when CPU 101 executes the mirror operation in step S308 in FIG. 3 will be described below. FIG. 5 is a flowchart illustrating the mirror operation of the in-vehicle display system according to the first exemplary embodiment. All steps in FIG. 5 are included in step S308.

CPU 101 displays the first content on second display unit 106 (mirror destination). Due to this operation, the first content is output to second display unit 106 as well as to first display unit 105.

CPU 101 determines whether an instruction regarding the operation is input from first operating unit 109. When determining that the instruction is input, CPU 101 proceeds to step S503, and when determining that no instruction is input, CPU 101 returns to the process in step S502.

CPU 101 determines whether the instruction instructs CPU 101 to end the mirror operation. When determining that the instruction instructs CPU 101 to end the mirror operation, CPU 101 proceeds to step S505, and when determining that the instruction does not instruct CPU 101 to end the mirror operation, CPU 101 proceeds to step S504.

When proceeding to step S504, CPU 101 causes the first application to perform the operation input to first operating unit 109. Then, CPU 101 displays the first content reflecting this operation on both first display unit 105 and second display unit 106.

On the other hand, when proceeding to step S505, CPU 101 ends displaying the first content on second display unit 106. When doing so, CPU 101 may display the default content on second display unit 106. Alternatively, CPU 101 may display the second content which has been displayed on the second display unit before the mirror operation on second display unit 106.

[3-3-4. Copy Operation]

Figure 6:
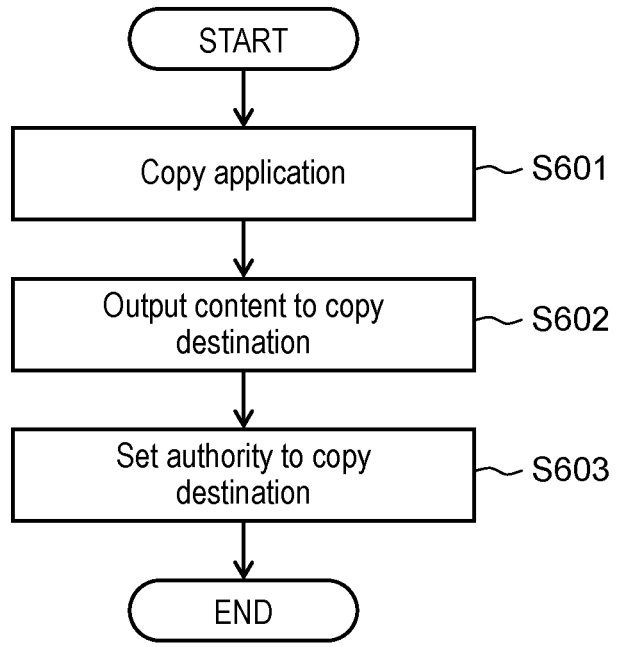
FIG. 6 is a flowchart illustrating a copy operation of the in-vehicle display system according to the first exemplary embodiment of the present disclosure.

The process when CPU 101 executes the copy operation in step S310 in FIG. 3 will be described below. FIG. 6 is a flowchart illustrating the copy operation of the in-vehicle display system according to the first exemplary embodiment. All steps in FIG. 6 are included in step S310.

CPU 101 generates a copy of the first application (step S601). Hereinafter, the copy of the first application is defined as a third application.

CPU 101 displays the first content output by the third application on second display unit 106 (copy destination) (step S602). Due to this copy operation, the same content is displayed on first display unit 105 and second display unit 106. Specifically, the first content output by the first application is displayed on first display unit 105, and the first content output by the third application is displayed on second display unit 106.

Then, CPU 101 gives an authority to operate the third application to second display unit 106 (step S603). After that, the operation for the third application is performed through second operating unit 110.

Thus, the user using first display unit 105 and the user using second display unit 106 can individually operate the same content. In this case, ending the application is individually performed for first display unit 105 and second display unit 106.

[3-3-5. Returning Operation]

Figure 7:
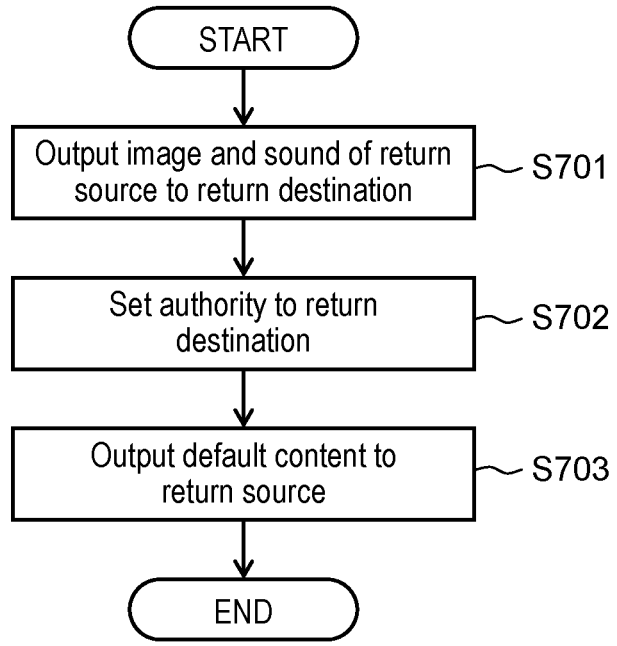
FIG. 7 is a flowchart illustrating a returning operation of the in-vehicle display system according to the first exemplary embodiment of the present disclosure.

FIG. 7 is a flowchart illustrating the returning operation of the in-vehicle display system according to the first exemplary embodiment. Herein, a process when the returning operation is performed after the execution of the movement operation in step S306 will be described as an example. Due to the movement operation, first display unit 105 displays the default content, and second display unit 106 displays the first content output by the first application. Further, due to the movement operation, the authority to operate the first application is given to second operating unit 110.

When the returning operation is input to first operating unit 109 in this state, CPU 101 displays the first content, which has been displayed on second display unit 106 (return source), on first display unit 105 (return destination) again (step S701).

Then, CPU 101 returns the destination to which the authority to operate the first application is given to first operating unit 109 from second operating unit 110 (step S702). After that, the operation for the first application is performed by user 120 through first operating unit 109.

CPU 101 displays the default content on second display unit 106 (step S703). Alternatively, CPU 101 may display the second content which has been displayed in the reference state again on second display unit 106 in step S703.

[4. Specific Example]

Specific operations of the in-vehicle display system according to the first exemplary embodiment will be described with reference to FIGS. 8 to 12.

[4-1. Specific Example of Movement Operation]

FIGS. 8A to 8D are views for describing a specific example of the movement operation of the in-vehicle display system according to the first exemplary embodiment.

In each of FIGS. 8A to 8D, display device 201 (first display unit 105) used by user 120 who is a driver is illustrated on the left side, and display device 202 (second display unit 106) used by user 121 on passenger seat 212 is illustrated on the right side.

Figure 8A:
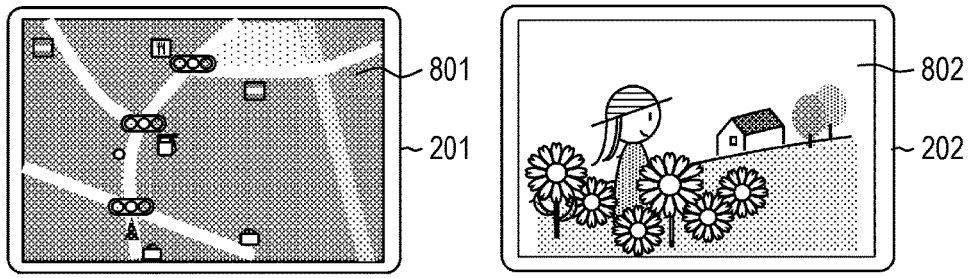
FIG. 8A is a view for describing a specific example of the movement operation of the in-vehicle display system according to the first exemplary embodiment of the present disclosure.
Figure 8B:
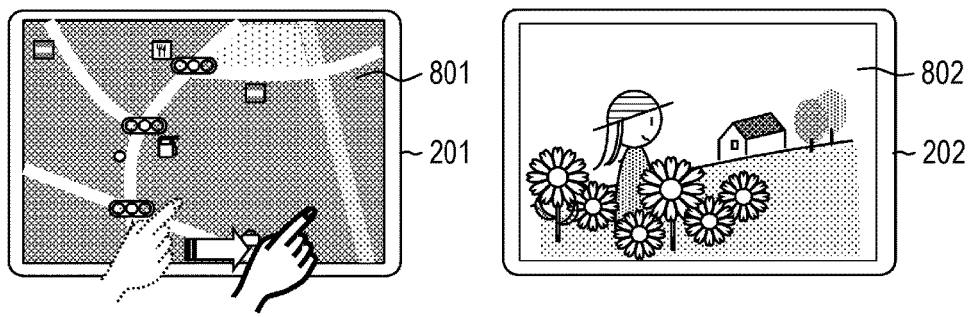
FIG. 8B is a view for describing the specific example of the movement operation of the in-vehicle display system according to the first exemplary embodiment of the present disclosure.
Figure 8C:
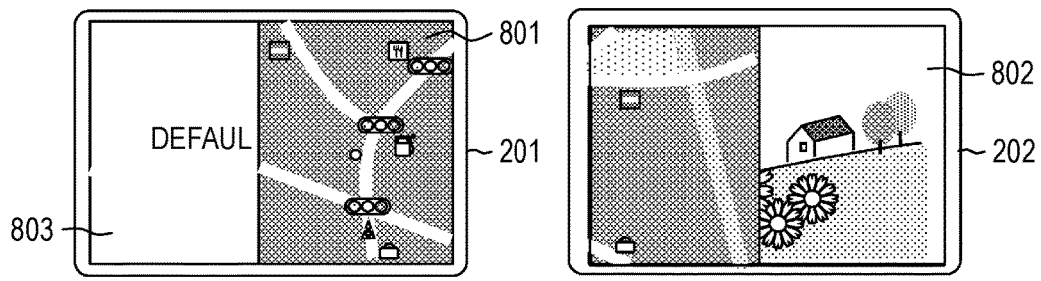
FIG. 8C is a view for describing the specific example of the movement operation of the in-vehicle display system according to the first exemplary embodiment of the present disclosure.
Figure 8D:
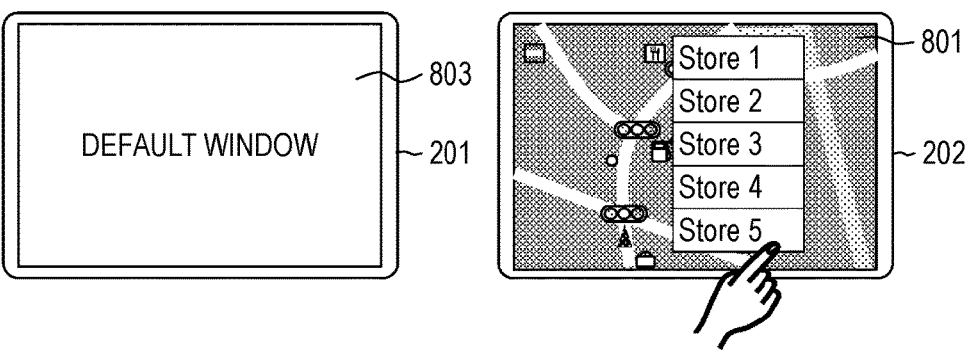
FIG. 8D is a view for describing the specific example of the movement operation of the in-vehicle display system according to the first exemplary embodiment of the present disclosure.

FIG. 8A illustrates display device 201 and display device 202 before the movement operation. FIG. 8B illustrates display device 201 and display device 202 while user 120 is performing the movement operation. FIG. 8C illustrates display device 201 and display device 202 while the in-vehicle display system is executing the movement operation. FIG. 8D illustrates display device 201 and display device 202 after the movement operation is executed.

Before the movement operation, display device 201 displays content 801 (first content) of a car navigation (first application) as illustrated in FIG. 8A. Display device 202 displays content 802 (second content) of a movie (second application).

Then, as illustrated in FIG. 8B, user 120 puts his/her finger on a screen of display device 201 and slides the finger from left to right. This is an operation for moving content 801 to the right display device, that is, display device 202.

During this operation, the vehicle information indicates a normal vehicle state. The detail of the display operation is the movement operation. Display device 201 is categorized as attribute 1, and display device 202 is categorized as attribute 2. The first application is categorized as application 2, and second application 2 is categorized as application 1. The first content is categorized as video, and the second content is categorized as video/sound. These information items are input to CPU 101.

CPU 101 decides to perform the movement operation based on the condition that the vehicle is in a normal state, the attribute of display device 201 is attribute 1, and the priority level of the first application is higher than the priority level of the second application. Note that CPU 101 can perform control such that the movement operation for movement from the display device with a lower priority to the display device with a higher priority is inhibited. The priority level may be determined based on one of the information items input to CPU 101, or may be comprehensively determined based on the combination of two or more information items.

When deciding to perform the movement operation, CPU 101 moves content 801 from first display unit 105 to second display unit 106 as illustrated in FIG. 8C. When doing so, CPU 101 causes display devices 201 and 202 to display content 801 to gradually move from display device 201 to display device 202. In addition, CPU 101 displays default content 803 on display device 201 with the movement of content 801. The movement of content 801 to the right side in this way allows user 120 to recognize that content 801 is moving to right display device 201. Further, user 121 on the passenger seat can recognize that content 801 is moving from display device 201.

After the movement operation is executed, default content 803 is displayed on display device 201, and content 801 is displayed on display device 202 as illustrated in FIG. 8D. Also, the destination to which the authority to operate content 801 is given is changed to the operating unit of display device 202 from the operating unit of display device 201. Therefore, user 121 on passenger seat 212 can operate content 801, that is, the car navigation, through display device 202. FIG. 8D illustrates that user 121 sets a destination.

[4-2. Specific Example of Mirror Operation]

Figure 9A:
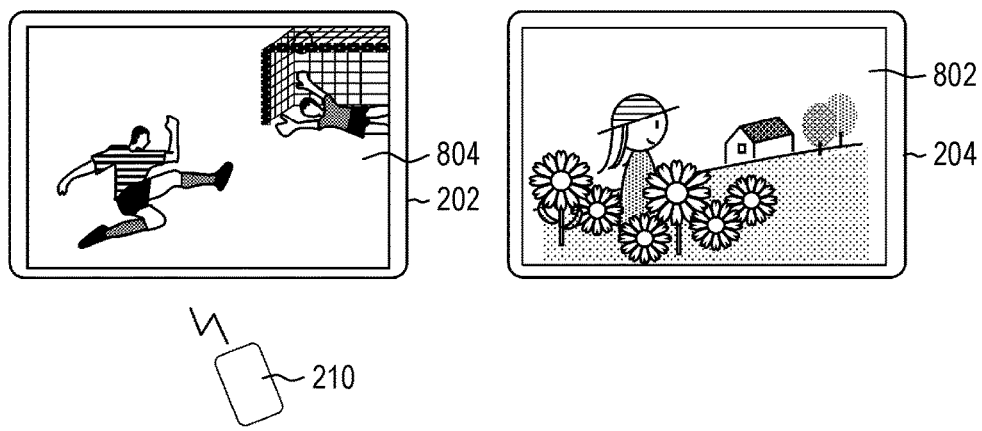
FIG. 9A is a view for describing a specific example of the mirror operation of the in-vehicle display system according to the first exemplary embodiment of the present disclosure.
Figure 9B:
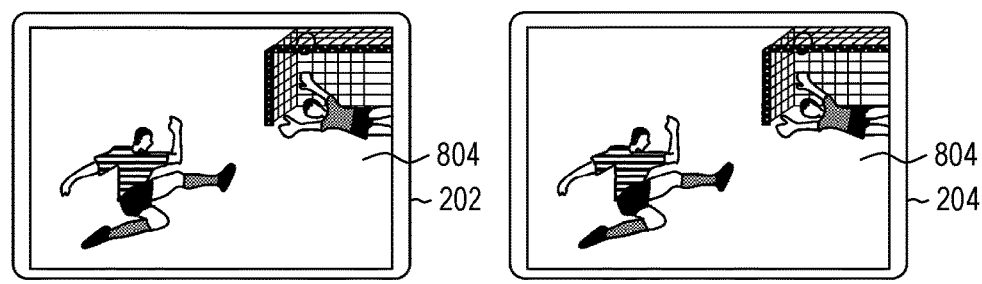
FIG. 9B is a view for describing the specific example of the mirror operation of the in-vehicle display system according to the first exemplary embodiment of the present disclosure.
Figure 9C:
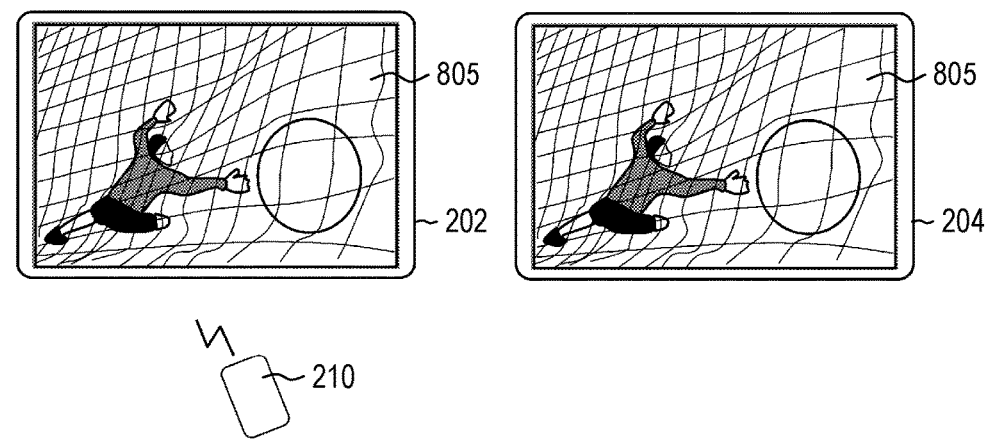
FIG. 9C is a view for describing the specific example of the mirror operation of the in-vehicle display system according to the first exemplary embodiment of the present disclosure.

FIGS. 9A to 9C are views for describing a specific example of the mirror operation of the in-vehicle display system according to the first exemplary embodiment.

In each of FIGS. 9A to 9C, display device 202 (first display unit 105) used by user 120 on passenger seat 212 is illustrated on the left side, and display device 204 (second display unit 106) used by user 121 on rear seat 213 is illustrated on the right side.

FIG. 9A illustrates display device 202 and display device 204 while user 120 is performing the mirror operation. FIG. 9B illustrates display device 202 and display device 204 after the mirror operation is executed. FIG. 9C illustrates display examples of display device 202 and display device 204 when an operation is performed through display device 202 after the mirror operation is executed.

Firstly, as illustrated in FIG. 9A, display device 202 displays content 804 (first content) of a soccer game output from a TV (first application). At that time, display device 204 displays content 802 (second content) output from a movie (second application). In this situation, user 120 using display device 202 is supposed to perform the mirror operation using remote controller 210. Remote controller 210 corresponds to first operating unit 109.

During this operation, the vehicle information indicates a normal vehicle state. The detail of the display operation is the mirror operation. Display device 202 and display device 204 are categorized as attribute 2. The first application and second application 2 are categorized as application 1. The first content and the second content are categorized as video/sound. These information items are input to CPU 101.

CPU 101 decides to perform the mirror operation based on the condition that the vehicle is in a normal state, the attributes of display device 202 and display device 204 are attribute 2, and the priority level of the first application and the priority level of the second application are the same.

When deciding to perform the mirror operation, CPU 101 causes display device 204 to display content 804 as illustrated in FIG. 9B. In this case, the operating unit (remote controller 210) of display device 202 remains having the authority to operate content 804.

When user 120 using display device 202 performs an operation for displaying scene 805 through remote controller 210 after the mirror operation is ended, same scene 805 is also displayed on display device 204, as illustrated in FIG. 9C. Notably, it may be set such that user 121 using display device 204 cannot operate content 804 on display device 204.

[4-3. Specific Example of Copy Operation]

Figure 10A:
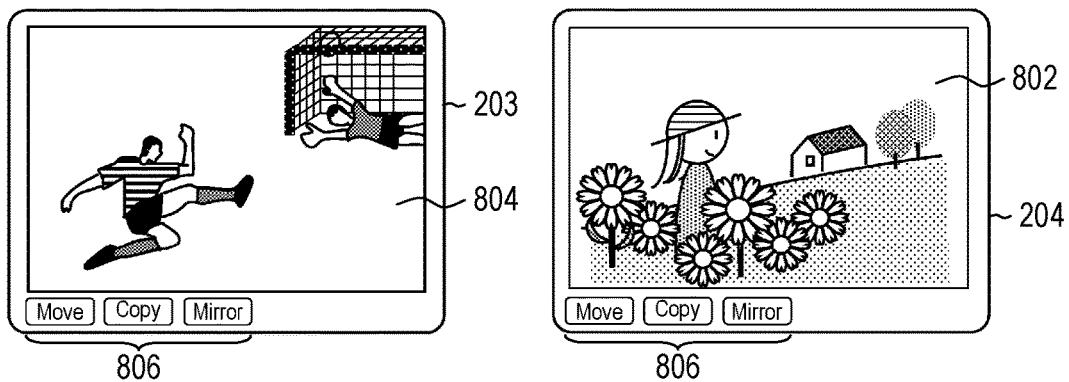
FIG. 10A is a view for describing a specific example of the copy operation of the in-vehicle display system according to the first exemplary embodiment of the present disclosure.
Figure 10B:
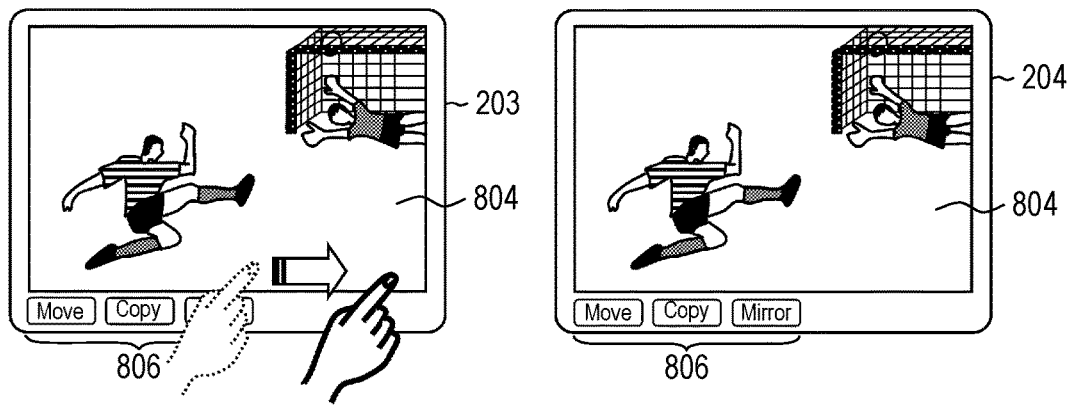
FIG. 10B is a view for describing the specific example of the copy operation of the in-vehicle display system according to the first exemplary embodiment of the present disclosure.
Figure 10C:
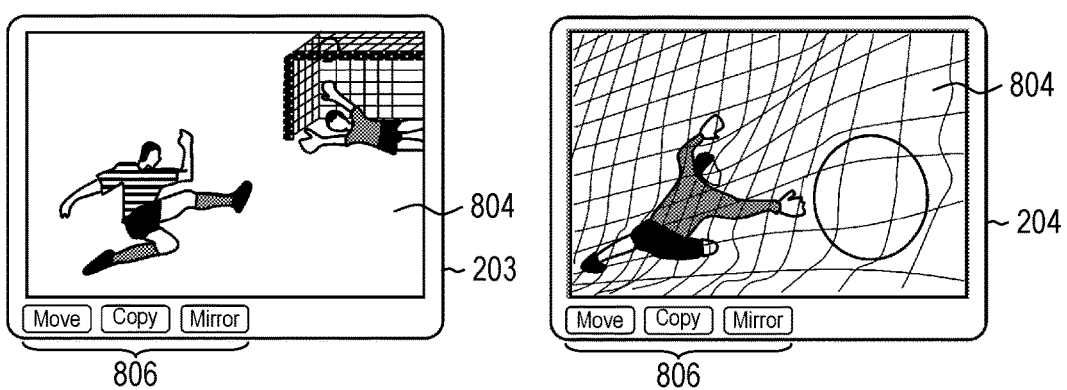
FIG. 10C is a view for describing the specific example of the copy operation of the in-vehicle display system according to the first exemplary embodiment of the present disclosure.

FIGS. 10A to 10C are views for describing a specific example of the copy operation of the in-vehicle display system according to the first exemplary embodiment.

In each of FIGS. 10A to 10C, display device 203 (first display unit 105) used by user 120 seated on rear seat 213 behind driver's seat 211 is illustrated on the left side. Display device 204 (second display unit 106) used by user 121 seated on rear seat 213 behind passenger seat 212 is illustrated on the right side. Display device 203 and display device 204 are provided with operation buttons 806 such as move, copy, and mirror.

FIG. 10A illustrates display device 203 and display device 204 before the copy operation. FIG. 10B illustrates display device 203 and display device 204 while user 120 is performing the copy operation. FIG. 10C illustrates display device 203 and display device 204 after the copy operation is executed.

Before the copy operation, display device 203 displays content 804 (first content) of a soccer game output from a TV (first application) as illustrated in FIG. 10A. Display device 204 displays content 802 (second content) of a movie (second application).

Then, as illustrated in FIG. 10B, after pressing copy operation button 806, user 120 using display device 203 puts his/her finger on a screen and slides the finger from left to right. This is an operation for displaying content 804 to the right display device, that is, display device 204.

During this operation, the vehicle information indicates a normal vehicle state. The detail of the display operation is the copy operation. Display device 203 and display device 204 are categorized as attribute 2. The first application and the second application are categorized as application 1. The first content and the second content are categorized as video/sound. These information items are input to CPU 101.

CPU 101 decides to perform the copy operation based on the condition that the vehicle is in a normal state, the attributes of display device 203 and display device 204 are attribute 2, and the priority level of the first application and the priority level of the second application are the same.

When deciding to perform the copy operation, CPU 101 generates a copy of the first application. The copy of the first application is defined as a third application. CPU 101 then displays the first content output from the third application on display device 204.

Same content 804 displayed on display device 203 is displayed on display device 204. In this case, the authority to operate content 804 is also given to the operating unit (second operating unit 110) of display device 204.

After the copy operation, display device 203 and display device 204 are individually operated. If the operation performed by user 120 to display device 203 and the operation performed by user 121 to display device 204 are different from each other, display device 203 and display device 204 display different scenes of content 804 as illustrated in FIG. 10C.

[4-4. Specific Example of Returning Operation]

FIGS. 11A to 11D are views for describing a specific example of the returning operation of the in-vehicle display system according to the first exemplary embodiment. FIGS. 11A to 11D illustrate the returning operation after the movement operation illustrated in FIGS. 8A to 8D.

In each of FIGS. 11A to 11D, display device 201 (first display unit 105) used by user 120 on driver's seat 211 is illustrated on the left side, and display device 202 (second display unit 106) used by user 121 on passenger seat 212 is illustrated on the right side. FIGS. 11A to 11D illustrate one example of the returning operation from display device 202 to display device 201.

Figure 11A:
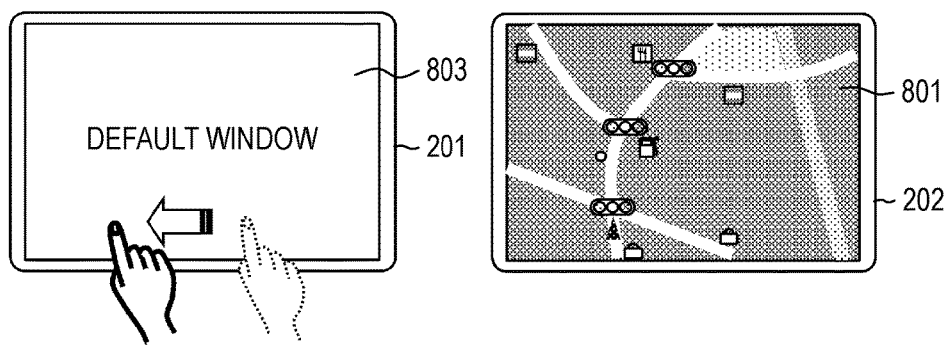
FIG. 11A is a view for describing a specific example of the returning operation of the in-vehicle display system according to the first exemplary embodiment of the present disclosure.
Figure 11B:
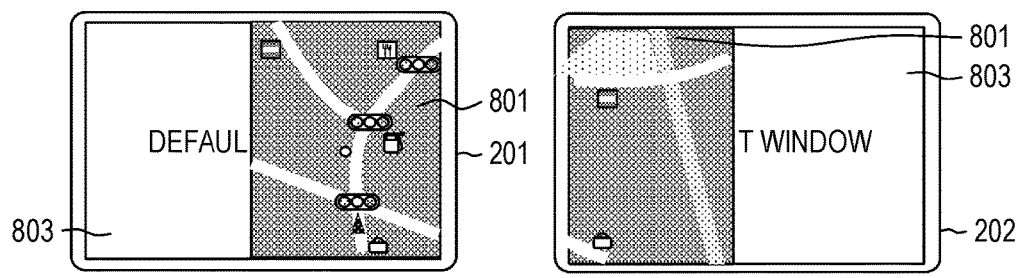
FIG. 11B is a view for describing the specific example of the returning operation of the in-vehicle display system according to the first exemplary embodiment of the present disclosure.
Figure 11C:
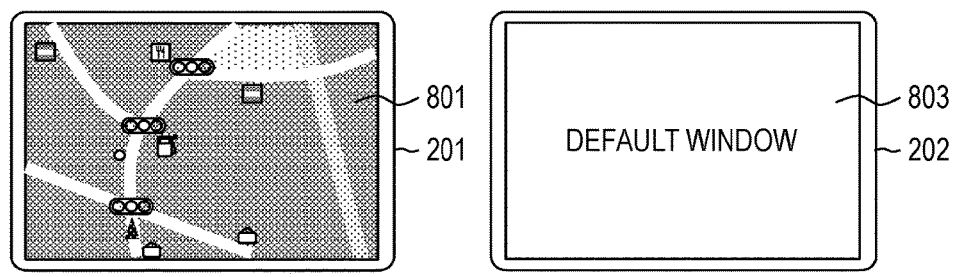
FIG. 11C is a view for describing the specific example of the returning operation of the in-vehicle display system according to the first exemplary embodiment of the present disclosure.
Figure 11D:
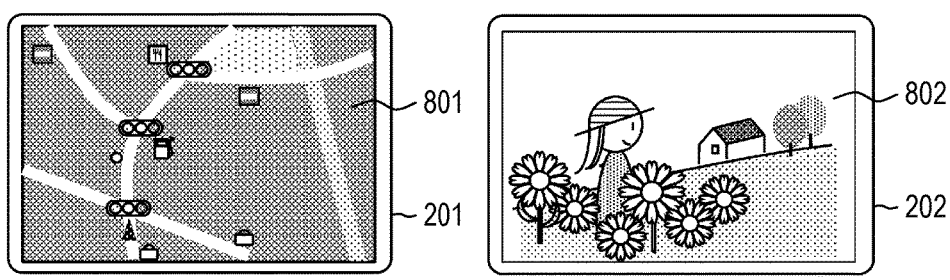
FIG. 11D is a view for describing the specific example of the returning operation of the in-vehicle display system according to the first exemplary embodiment of the present disclosure.

FIG. 11A illustrates display device 201 and display device 202 while user 120 is performing the returning operation. FIG. 11B illustrates display device 201 and display device 202 while the in-vehicle display system is executing the returning operation. FIG. 11C illustrates display device 201 and display device 202 after the returning operation is executed. FIG. 11D illustrates another display example of display device 202 after the returning operation.

In a case where the movement operation illustrated in FIGS. 8A to 8D is executed, default content 803 is displayed on display device 201 (first display unit 105) as illustrated in FIG. 11A. Default content 803 is defined as fourth content executed by a fourth application. A car navigation is displayed on display device 202 (second display unit 106). The car navigation is defined as content 801 (first content) output by the first application.

As illustrated in FIG. 11A, user 120 slides his/her finger from right to left on the screen of display device 201. This is an operation for returning content 801 (first application) displayed on right display device 202 to display device 201.

During this operation, the vehicle information indicates a normal vehicle state. The detail of the operation indicates the returning operation. Display device 201 is categorized as attribute 1, and display device 202 is categorized as attribute 2. The first application is categorized as application 2. The first content and the fourth content are categorized as video. These information items are input to CPU 101.

CPU 101 decides to perform the returning operation based on the condition that the vehicle is in a normal state, the attribute of display device 201 is attribute 1, and the priority level of the first application is higher than the priority level of the fourth application.

CPU 101 moves content 801 from display device 202 to display device 201 as illustrated in FIG. 11B. When doing so, CPU 101 causes display devices 201 and 202 to display content 801 to gradually move from display device 202 to display device 201. In addition, CPU 101 displays default content 803 on display device 202 with the movement of content 801 to display device 201. The movement of content 801 from right to left in this way allows user 120 to recognize that content 801 is moving from right display device 202. Further, user 121 can recognize that content 801 is moving to display device 201.

After the returning operation is finished, display device 201 displays content 801, and display device 202 displays default content 803 as illustrated in FIG. 11C. In addition, CPU 101 changes the destination to which the authority to operate content 801 is given to the operating unit (first operating unit 109) of display device 201 from the operating unit (second operating unit 110) of display device 202. Accordingly, user 120 becomes capable of operating again content 801. On the other hand, after the returning operation is finished, user 121 becomes unable to operate content 801.

It is to be noted that, after executing the returning operation, CPU 101 may display the content (content 802 illustrated in FIG. 8A) which has been displayed before the returning operation on display device 202 as illustrated in FIG. 11D.

[4-5. Specific Example of Partial Movement Operation]

FIGS. 12A to 12E are views for describing a specific example of a partial movement operation of the in-vehicle display system according to the first exemplary embodiment. The partial movement operation is an operation for moving a portion of content. Only the content which is needed to be supported by another user can be moved.

In each of FIGS. 12A to 12E, display device 201 (first display unit 105) used by user 120 on driver's seat 211 is illustrated on the left side, and display device 202 used by user 121 on passenger seat 212 is illustrated on the right side.

Figure 12A:
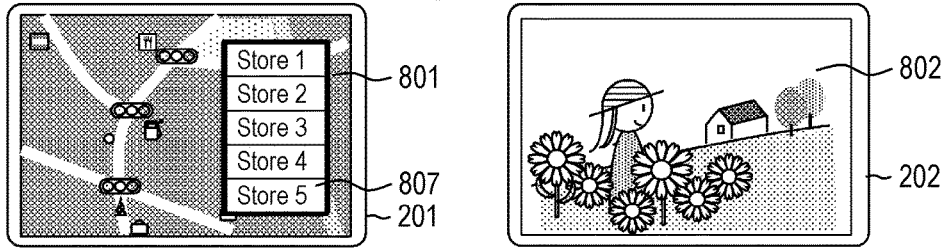
FIG. 12A is a view for describing a specific example of a partial movement operation of the in-vehicle display system according to the first exemplary embodiment of the present disclosure.
Figure 12B:
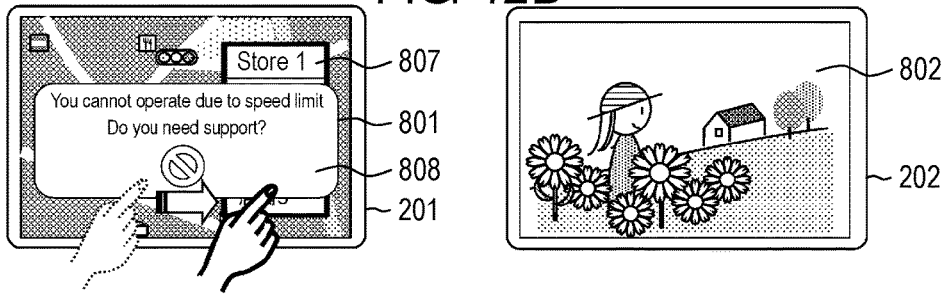
FIG. 12B is a view for describing the specific example of the partial movement operation of the in-vehicle display system according to the first exemplary embodiment of the present disclosure.
Figure 12C:
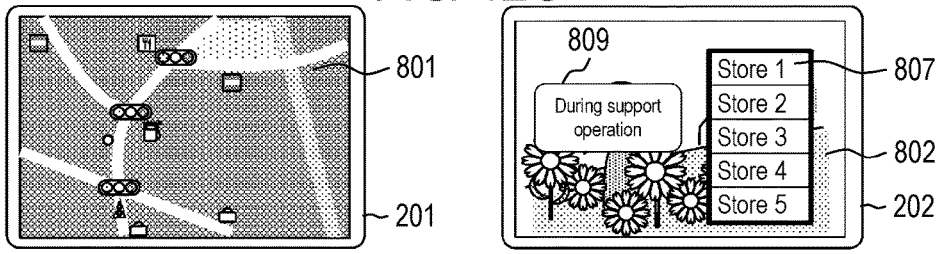
FIG. 12C is a view for describing the specific example of the partial movement operation of the in-vehicle display system according to the first exemplary embodiment of the present disclosure.
Figure 12D:
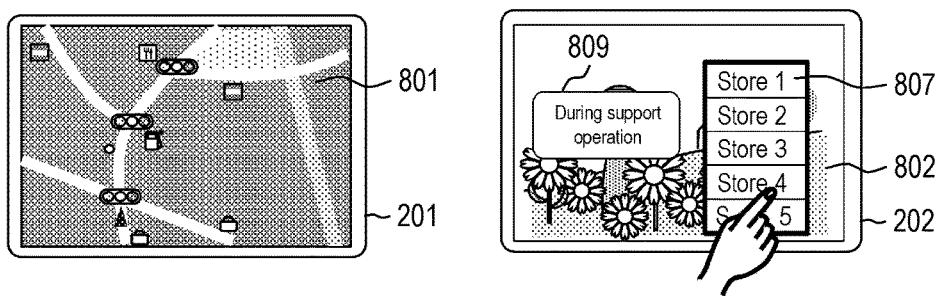
FIG. 12D is a view for describing the specific example of the partial movement operation of the in-vehicle display system according to the first exemplary embodiment of the present disclosure.
Figure 12E:
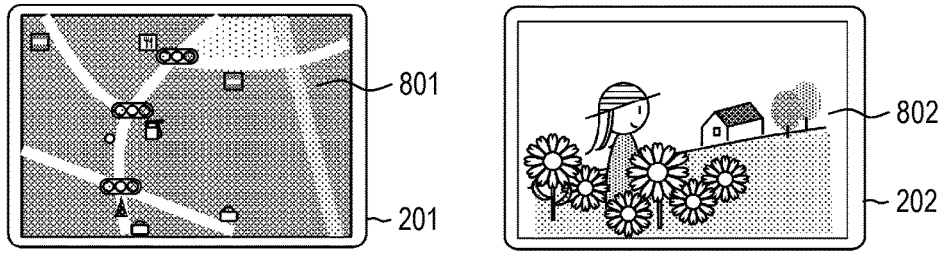
FIG. 12E is a view for describing the specific example of the partial movement operation of the in-vehicle display system according to the first exemplary embodiment of the present disclosure.

FIG. 12A illustrates display device 201 and display device 202 before the partial movement operation. FIG. 12B illustrates display device 201 and display device 202 while user 120 is performing the partial movement operation. FIGS. 12C to 12E illustrate display device 201 and display device 202 after the partial movement operation is executed.

As illustrated in FIG. 12A, display device 201 displays content 801 (first content) output by a car navigation (first application). A portion of content 801 is window 807 for setting a destination (store). On the other hand, display device 202 displays content 802 (second content) of a movie (second application).

In this case, if the speed of vehicle 200 exceeds a predetermined speed, CPU 101 controls such that user 120 who is a driver is unable to operate display device 201. Then, CPU 101 displays message 808 indicating a support instruction on display device 201 as illustrated in FIG. 12B. The support instruction is issued for asking another user to perform the operation for the display device in place of the user.

In a case where user 120 intends to ask user 121 on passenger seat 212 to support the operation for window 807, user 120 places his/her finger on the screen of display device 201, and slides the finger from left to right, as illustrated in FIG. 12B.

During this operation, the vehicle information indicates a non-normal emergency state. The detail of the display operation is the movement operation. Display device 201 is categorized as attribute 1, and display device 202 is categorized as attribute 2. The first application is categorized as application 2, and the second application is categorized as application 1. The first content is categorized as video, and the second content is categorized as video/sound. These information items are input to CPU 101.

CPU 101 decides to perform the partial movement operation based on the condition that the vehicle is not in a normal state, the attribute of display device 201 is attribute 1, and the priority level of the first application is higher than the priority level of the second application.

When deciding to perform the partial movement operation, CPU 101 displays window 807 and message 809 on content 802 on display device 202 as illustrated in FIG. 12C. Message 809 indicates that the operation for another display device is being supported. During the support, content 802 on display device 202 may be grayed out or the contrast may be changed. Due to such a display, user 121 clearly recognizes that he/she supports the other display device. During the support by display device 202, display device 201 displays only content 801, and does not display window 807. Further, content 801 on display device 201 may be grayed out or the contrast may be changed, so as to clearly indicate that user 120 is being supported.

Next, user 121 on passenger seat 212 operates window 807 displayed on display device 202 to select a destination, as illustrated in FIG. 12D.

When the destination is selected, display device 202 ends displaying window 807, and displays content 802 again as illustrated in FIG. 12E. On the other hand, the destination selected by the user in FIG. 12D is set as a destination on the car navigation displayed on display device 201.

[5. Summary]

The in-vehicle display system according to the first exemplary embodiment is provided with at least first display unit 105, second display unit 106, vehicle information acquisition unit 103, and controller 101. The in-vehicle display system can perform a display operation for outputting at least a portion of first content to second display unit 106 with the first content being output to first display unit 105. When the display operation is performed, CPU 101 selects either of first display unit 105 and second display unit 106 with which to associate an authority to operate the output of at least one of first display unit 105 and second display unit 106 according to at least one of signals indicating a type of the first content, an attribute of first display unit 105, an attribute of second display unit 106, vehicle information acquired by vehicle information acquisition unit 103, and a detail of the display operation.

A control method for the in-vehicle display system according to the first exemplary embodiment includes selecting, when a display operation for outputting at least a portion of first content to second display unit 106 with the first content being output to first display unit 105 is performed, either of first display unit 105 and second display unit 106 with which to associate an authority to operate the output of at least one of first display unit 105 and second display unit 106 according to at least one of signals indicating a type of the first content, an attribute of first display unit 105, an attribute of second display unit 106, vehicle information, and a detail of the display operation.

Thus, the respective display devices can be individually operated, and further, can be operated in coordination with one another in various ways. Therefore, functionality of the whole system can be improved.

In addition, the in-vehicle display system according to the first exemplary embodiment performs the display operation through first display unit 105. Thus, the user can perform the operation while viewing first display unit 105, whereby the user can easily perform the operation. Particularly when first display unit 105 is a touch panel, it can be set such that the operation of the in-vehicle display system can be assumed from the movement of fingers of the user. Accordingly, the user can more easily operate the in-vehicle display system.

In the in-vehicle display system according to the first exemplary embodiment, the display operation is performed with second content being output to second display unit 106, and a signal indicating the type of the second content is input to CPU 101. Thus, CPU 101 can decide the type of the display operation after comparing the priority levels of the first content and the second content. Accordingly, CPU 101 can select a safer display operation or select a display operation reflecting the intention of the user.

(Other Exemplary Embodiments)

The first exemplary embodiment has been described above as an example of the technique disclosed in the present application. However, the technique in the present disclosure is not limited thereto, and can also be applied to exemplary embodiments subjected to modification, substitution, addition, omission and the like. In addition, new exemplary embodiments can be made by combining constituents described in the above first exemplary embodiment.

Therefore, other exemplary embodiments will be described below.

In the display operation such as the movement operation, copy operation, and mirror operation described in the first exemplary embodiment, the content displayed on first display unit 105 is displayed on second display unit 106 through first display unit 105 operated. However, the content displayed on first display unit 105 may be displayed on second display unit 106 through second display unit 106 operated. Then, the CPU may select either of first display unit 105 and second display unit 106 with which to associate an authority to operate the output of at least one of first display unit 105 and second display unit 106.

FIGS. 13A to 13D are views for describing a specific example of a copy operation of an in-vehicle display system according to another exemplary embodiment.

In each of FIGS. 13A to 13D, display device 204 (first display unit 105) used by user 120 on rear seat 213 behind passenger seat 212 is illustrated on the right side. Display device 203 (second display unit 106) used by user 121 on rear seat 213 behind driver's seat 211 is illustrated on the left side.

Figure 13A:
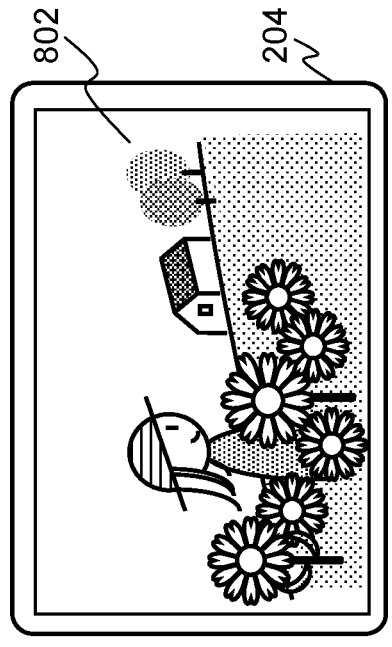
FIG. 13A is a view for describing a specific example of a copy operation of an in-vehicle display system according to another exemplary embodiment of the present disclosure.
Figure 13A:
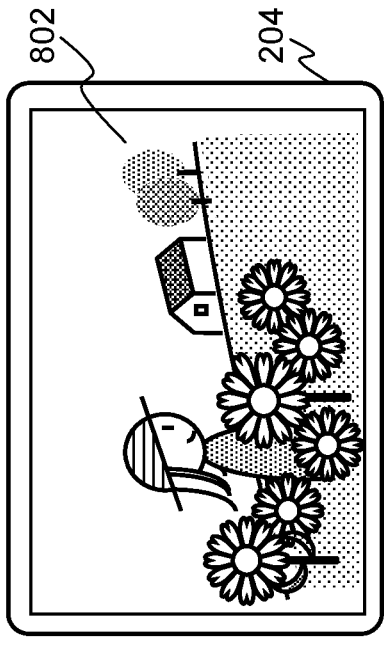
Figure 13B:
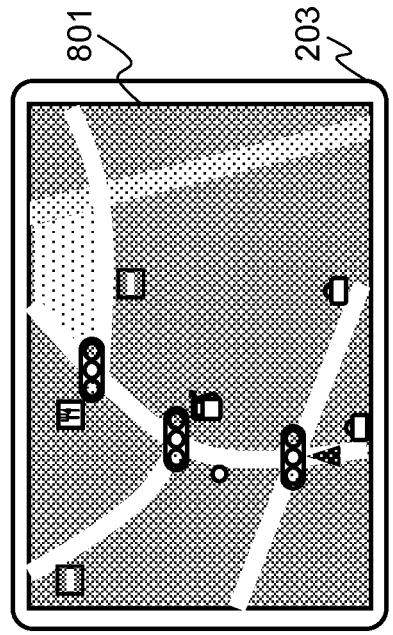
FIG. 13B is a view for describing the specific example of the copy operation of the in-vehicle display system according to the other exemplary embodiment of the present disclosure.
Figure 13B:
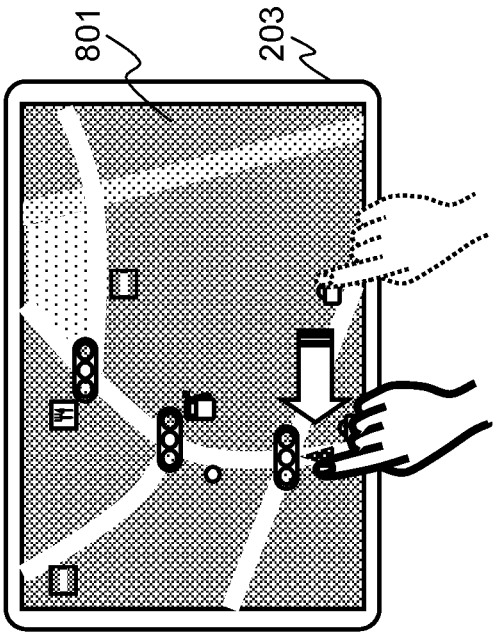
Figure 13C:
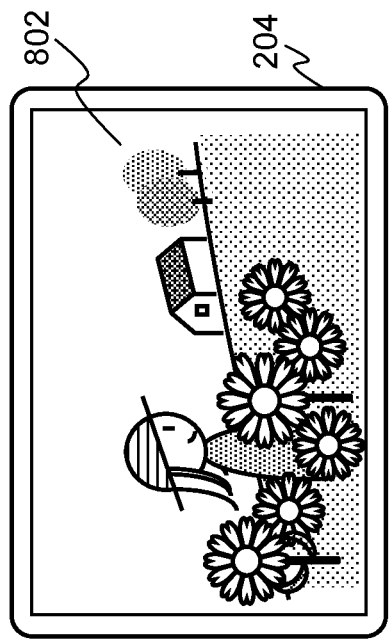
FIG. 13C is a view for describing the specific example of the copy operation of the in-vehicle display system according to the other exemplary embodiment of the present disclosure.
Figure 13D:
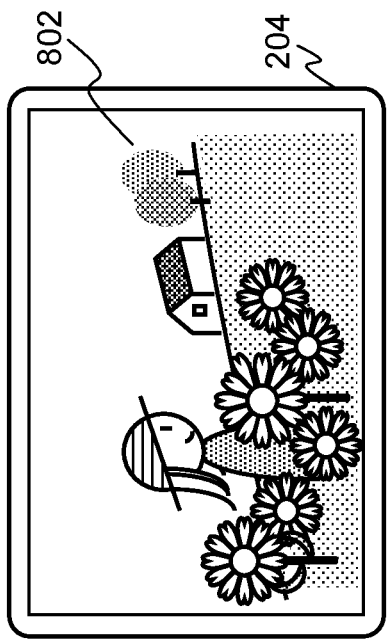
FIG. 13D is a view for describing the specific example of the copy operation of the in-vehicle display system according to the other exemplary embodiment of the present disclosure.

FIG. 13A illustrates display device 203 and display device 204 before the copy operation. FIG. 13B illustrates display device 203 and display device 204 while user 121 is performing the copy operation. FIG. 13C illustrates display device 203 and display device 204 while the in-vehicle display system is executing the copy operation. FIG. 13D illustrates display device 203 and display device 204 after the copy operation is executed.

Before the copy operation, display device 204 serving as first display unit 105 displays content 802 of a movie (first application) as illustrated in FIG. 13A. Display device 203 serving as second display unit 106 displays content 801 (second content) of a car navigation (second application).

Then, as illustrated in FIG. 13B, user 121 using display device 203 puts his/her finger on a screen and slides the finger from right to left. This is an operation for displaying content 802 on right display device 204 to left display device 203.

During this operation, the vehicle information indicates a normal vehicle state. The detail of the display operation is the copy operation. Display device 203 and display device 204 are categorized as attribute 2. The first application is categorized as application 1, and the second application is categorized as application 2. The first content is categorized as video/sound, and the second content is categorized as video. These information items are input to CPU 101.

CPU 101 decides to perform the copy operation based on the condition that the attributes of display device 203 and display device 204 are attribute 2 and the vehicle information indicates a normal vehicle state, although the priority level of the first application is lower than the priority level of the second application.

When deciding to perform the copy operation, CPU 101 generates a copy of the first application. The copy of the first application is defined as a third application. CPU 101 then displays content 802 (first content) output from the third application on display device 203. As illustrated in FIGS. 13C and 13D, content 802 is gradually displayed on display device 203 from right to left.

After the copy operation is executed, same content 802 displayed on display device 204 is displayed on display device 203 as illustrated in FIG. 13D. In this case, the authority to operate content 802 is also given to the operating unit of display device 203.

After the copy operation is executed, display device 203 and display device 204 are individually operated. If the operation performed by user 121 to display device 203 and the operation performed by user 120 to display device 204 are different from each other, display device 203 and display device 204 display different scenes of content 802. While the copy operation has been described with reference to FIGS. 13A to 13D, other display operations such as the movement operation, the mirror operation, and the returning operation can be performed through second display unit 106.

Other exemplary embodiments will further be described. The first exemplary embodiment has described the example where, after the display operation such as the movement operation, the copy operation, or the mirror operation is performed, CPU 101 in the in-vehicle display system according to the first exemplary embodiment selects either of first display unit 105 and second display unit 106 with which to associate an authority to operate first display unit 105 or an authority to operate first display unit 105 and second display unit 106. However, CPU 101 may select either of first display unit 105 and second display unit 106 with which to associate only an authority to operate second display unit 106 after any of the display operations.

In the in-vehicle display system according to the present disclosure, when the user specifies and inputs any of the movement operation, the copy operation, and the mirror operation as the display operation, CPU 101 can select other display operations. CPU 101 can select an optimum display operation regardless of the intention of the user based on the information such as the vehicle information input to CPU 101.

Further, vehicle information acquisition unit 103 in the present disclosure may acquire information around the vehicle, information about a road on which the vehicle is traveling, weather, traffic information, and a driver's condition, for example. In this case, CPU 101 may control the display of the respective display devices by using various types of information regarding the vehicle. For example, in a case where the display operation is performed for the display device used by the driver at night, under bad weather conditions, or during traveling on a curvy road, CPU 101 may perform the movement operation or the partial movement operation accompanying the transfer of the authority to operate.

Any unit other than the unit described in the first exemplary embodiment may be used as the unit for inputting the display operation. For example, all types of display operations may be performed through a touch panel, a remote controller, or an operation button. When the display operation is performed using a touch panel, any one of the display operations such as the movement operation, the copy operation, and the mirror operation may be selected based on a number of fingers touching the screen. It should be noted that the in-vehicle display system may be configured such that CPU 101 selects any one of the display operations according to various conditions without allowing the user to specify the type of the display operation such as the movement operation, the copy operation, or the mirror operation.

When the display operation is input, the destination of content may be indicated by the direction of the movement of fingers on the screen. For example, to move the screen from display device 201 for driver's seat 211 and display device 202 for passenger seat 212 to display device 203 and display device 204 for rear seat 213, the user may slide his/her finger from top to bottom. On the contrary, to move the screen from display device 203 and display device 204 on the rear to display device 201 and display device 202 on the front, the user may slide his/her finger from bottom to top. Further, operation buttons corresponding to the respective display operations may be displayed on display screens of the display devices. Alternatively, the display devices may be provided with operation buttons.

In addition, which display operation is performed among the movement operation, the mirror operation, and the copy operation to display the content displayed on second display unit 106 may be explicitly shown.

The specific example of the movement operation in the first exemplary embodiment has described the case where user 120 using first display unit 105 receives support from user 121 using second display unit 106 for the operation. However, a support screen may be transmitted to second display unit 106 from two or more display units. In this case, second display unit 106 may determine an emergency level based on the type of an application or the detail of content, and display and process the output having a higher emergency level.

The in-vehicle display system provided with two display units, two sound output devices, and two operation units has been described in FIG. 2 as one example. However, the in-vehicle display system may be provided with three or more display units, sound output devices, and operation units. If the in-vehicle display system is provided with three or more display units, sound output devices, and operation units, one unit consisting of two display units, two sound output devices, and two operation units may be formed, and a plurality of such a unit may be disposed. The operation according to the present disclosure may be achieved by CPUs 101 in the respective units communicating with one another. For example, the unit may be provided each on a front seat and a rear seat in the vehicle, and CPUs 101 in the respective units may communicate with each other.

The first exemplary embodiment has described an example where, when content on one of display devices is displayed on the other display device, the content is gradually moved from the one of the display devices to the other, or the content is switched and displayed. However, the content may be displayed in a manner other than the above-mentioned manner in the first exemplary embodiment. Any display manner may be used, so long as it does not hinder driving by the driver and provides a display by which a target of the display operation and a target to be processed by the display operation are easy to be recognized. Further, for the display devices other than the display device for the driver, other animation displays may be used such as a display where content is moved from the center to the periphery.

In the first exemplary embodiment, second display unit 106 displays the second content in the reference state. However, second display unit 106 may display nothing.

INDUSTRIAL APPLICABILITY

The present disclosure is effective for display control of a vehicle provided with a plurality of display devices.

REFERENCE MARKS IN THE DRAWINGS 100 in-vehicle display system
101 CPU (controller)
102 memory
103 vehicle information acquisition unit
104 information source
105 first display unit
106 second display unit
107 first sound output device
108 second sound output device
109 first operating unit
110 second operating unit
111 transmission path
200 vehicle
201 display device
202 display device
203 display device
204 display device
211 driver's seat
212 passenger seat
213 rear seat
221 sound output device
222 sound output device
223 sound output device
224 sound output device

The invention claimed is:

1. An in-vehicle display system comprising:
a first display;
a second display;
a vehicle information acquirer that acquires vehicle information; and
a controller configured to:
acquire a display operation inputted by a user thorough the first display, when the display operation for outputting at least a portion of first content displayed on the first display to the second display with the first content currently being output to the first display, is performed;
determine whether or not the display operation is executable according to at least one signal from among a plurality of signals indicating a type of the first content, an attribute of the first display, an attribute of the second display, the vehicle information, and a detail of the display operation, and
select either of the first display and the second display with which to associate, according to the determined display operation, a user's authority to operate the first content outputted currently to at least one of the first display and the second display.

2. The in-vehicle display system according to claim 1, wherein the display operation is performed while second content is currently outputted to the second display.

3. The in-vehicle display system according to claim 2, wherein a signal indicating a type of the second content is input to the controller.

4. A control method for an in-vehicle display system, the control method comprising:
acquiring vehicle information about the vehicle;
acquiring a display operation inputted by a user thorough the first display, when the display operation for outputting at least a portion of first content displayed on a first display to the second display with the first content currently being output to the first display, is performed;
determining whether or not the display operation is executable according to at least one signal from among a plurality of signals indicating a type of the first content, an attribute of the first display, an attribute of the second display, the vehicle information, and a detail of the display operation; and
selecting either of the first display and a second display with which to associate, according to the determined display operation, a user's authority to operate the first content outputted currently to at least one of the first display and the second display.

5. The control method for the in-vehicle display system according to claim 4, wherein the display operation is performed while second content is currently outputted to the second display.

6. The control method for the in-vehicle display system according to claim 5, wherein a signal indicating a type of the second content is input to the controller in the selecting.

* * * * *